Patented Sept. 1, 1931

1,821,023

UNITED STATES PATENT OFFICE

PAUL NAWIASKY, OF LUDWIGSHAFEN-ON-THE-RHINE, AND EDUARD HOLZAPFEL AND OTTO BRAUNSDORF, OF HOCHST-ON-THE-MAIN, GERMANY, ASSIGNORS TO GENERAL ANILINE WORKS, INC., OF NEW YORK, N. Y., A CORPORATION

VAT DYESTUFFS OF THE BENZANTHRONE SERIES AND A PROCESS OF MAKING SAME

No Drawing. Application filed October 10, 1925, Serial No. 61,775, and in Germany October 20, 1924.

Our present invention relates to the preparation of vat dyestuffs of the benzanthrone series.

We have found that benzanthronylsulfides and other thio-ethers of the benzanthrone, for instance alkyl- or aryl-benzanthronyl thio-ethers and also their derivatives are converted into vat dyestuffs by treating them with alkali metal hydroxides.

The benzanthronyl-compounds above mentioned may be, for instance, obtained by the action of a sulphur halide upon a benzanthrone or by acting on halogen benzanthrones or nitro-benzanthrones or nitro-halogen benzanthrones with sulphur or certain sulphur compounds. In the case of halogen derivatives of benzanthrone, the reaction is carried out with an inorganic sulphide particularly alkali metal sulphide or with aryl-mercaptans or benzanthrone-mercaptans, while in the case of nitro-benzanthrones or nitro-halogen-benzanthrones sulphur itself or benzanthrone-mercaptans are most suitably employed. As is the case with the unsubstituted Bz-1-thio-ethers of the benzanthrone, the condensation of the various substituted thio-ethers of benzanthrone with alkaline condensing agents takes place in a more uniform and easier manner than in the hitherto known processes.

The following examples serve to illustrate our invention, the parts being by weight:

1. 5 parts of caustic potash are mixed with 4-5 parts of ethyl alcohol and into this mixture is introduced at about 135° C. one part of Bz1, Bz1'-benzanthronysulphide and the molten mass is then heated to 130–140° C. until the reaction is complete. The dyestuff, after being isolated in the usual manner forms a dark violet powder which, without necessitating any further purification, dissolves in concentrated sulfuric acid to a pure green solution. The dyestuff is soluble, but only with great difficulty, in nitro benzene to a reddish-violet solution showing a bright red fluorescence. The dyestuff has proved to be free from sulfur. It gives with hydrosulfite a bluish-violet vat dyeing a violet tint with a considerably redder hue than the isoviolanthrone described in U. S. Patent No. 906,367 issued December 8, 1908 and it may, therefore, be regarded as a substantially purer isoviolanthrone of the formula:

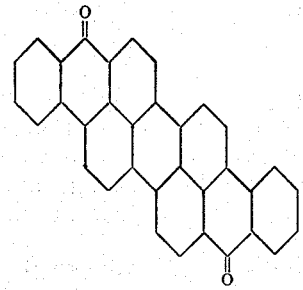

2. Into a fusion of alcoholic potassium hydroxide, obtained by heating 80 parts of potassium hydroxide and 80 parts of ethyl alcohol to 135° C. and distilling off the excess of alcohol, are introduced at 135–140° C. 20 parts of Bz-1-thiocresyl benzanthrone produced for instance by heating Bz-1-chloro benzanthrone with the calculated quantity of para-thio-cresol and potassium hydroxide in alcoholic solution, and the resulting molten mass is stirred for one hour at 140–145° C. Thereupon the mass is diluted with water and into this suspension air is passed until the dyestuff dissolved in form of its hydro compound is wholly precipitated; the product is then filtered and well washed with water. The resulting dyestuff constitutes iso dibenzanthrone which is practically entirely free from dibenzanthrone.

There may be used instead of ethyl alcohol any other aliphatic monatomic alcohol of low molecular weight and instead of potassium hydroxide any other caustic alkali.

3. Into a fusion produced from 150 parts of potassium hydroxide and 150 parts of alcohol are introduced at about 140° C. 30 parts of Bz-1-benzanthronyl-mercaptan-methyl-ether (melting point 152–154° C.) and the whole is then stirred for about one hour at the same temperature. The reaction mixture, after being worked up in the usual manner, yields isodibenzanthrone equaling as regards purity the product prepared according to the preceding examples.

4. 10 parts of Bz2.Bz2'-dimethoxy-Bz1, Bz1'-benzanthronyl-sulfide obtained by submitting Bz2-methoxy-Bz1-halogen-benzanthrone to reaction with sodium polysulfide, are introduced at 130–140° C. into a fusion of 50 parts of caustic potash and 40 parts of ethyl alcohol and the reaction mixture is stirred at the said temperature until the formation of the Bz2-Bz2'-dimethoxy isodibenzanthrone of the formula:

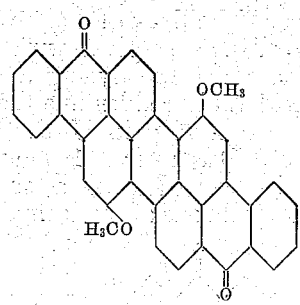

is complete. The dyestuff is isolated in the usual manner and forms a bluish black powder which dissolves in concentrated sulfuric acid with a reddish violet color and gives with hydrosulfite a blue vat dyeing cotton blue tints.

5. Into a fusion, heated to 135–140° C., of 100 parts of caustic potash and 80 parts of ethyl alcohol are introduced, while stirring, 20 parts of 6-6'-diamino-Bz-1-Bz-1'-benzanthronyl-sulfide (produced by the action of sodium disulphide upon 6-nitro-Bz1-bromobenzanthrone at a temperature varying from 130 to 150° C.). The mixture is kept for about one hour at 135–140° C. and the dyestuff is isolated as usual. It is 6.6'-diamino-isodibenzanthrone of the formula:

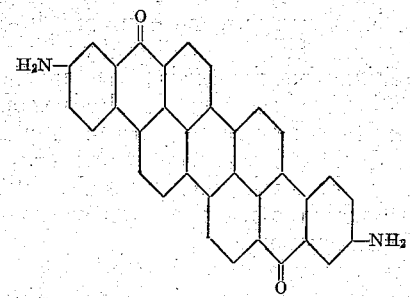

It constitutes a bluish violet powder which dissolves in concentrated sulfuric acid to a green solution and gives with hydrosulfite a blue vat dyeing cotton violet-blue tints.

We claim:

1. As a new product, 6.6'-diamino-isodibenzanthrone of the followng formula:

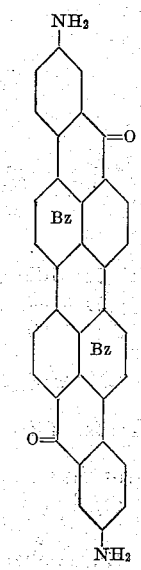

being a dark blue violet powder soluble in concentrated sulfuric acid with a green color, yielding a blue vat from which cotton is dyed violet-blue.

2. The process which comprises melting a Bz-1-Bz-1'-benzanthronylsulfide with an alkali metal hydroxide in the presence of an aliphatic monatomic alcohol of low molecular weight.

3. The process which comprises heating a Bz-1-Bz-1'-benzanthronylsulfide with caustic potash in the presence of ethyl alcohol to a temperature of about 130–145° C.

4. The process which comprises heating 6.6'-diamino-Bz-1-Bz-1'-benzanthronylsulfide with caustic potash in the presence of ethyl alcohol for about one hour to a temperature of about 135–140° C.

In testimony whereof, we affix our signatures.

PAUL NAWIASKY.
EDUARD HOLZAPFEL.
OTTO BRAUNSDORF.